(12) United States Patent
Gardner et al.

(10) Patent No.: US 7,198,826 B2
(45) Date of Patent: Apr. 3, 2007

(54) PROVIDING A SURFACE LAYER OR STRUCTURE ON A SUBSTRATE

(75) Inventors: Ian Andrew Gardner, Cambs (GB); Micheal Seal, Cambs (GB)

(73) Assignee: FFEI Limited (GB)

( * ) Notice: Subject to any disclaimer, the term of this patent is extended or adjusted under 35 U.S.C. 154(b) by 153 days.

(21) Appl. No.: 10/958,529

(22) Filed: Oct. 4, 2004

(65) Prior Publication Data

US 2005/0110853 A1    May 26, 2005

(30) Foreign Application Priority Data

Oct. 7, 2003   (GB)   ................ 0323462.2

(51) Int. Cl.
*B05D 5/00* (2006.01)
*B05D 1/26* (2006.01)

(52) U.S. Cl. .................. 427/466; 427/469; 427/258; 427/265

(58) Field of Classification Search ............... 427/466, 427/467, 469, 258, 261, 265, 286
See application file for complete search history.

(56) References Cited

U.S. PATENT DOCUMENTS

| | | | |
|---|---|---|---|
| 4,379,185 A | 4/1983 | Smith et al. | |
| 5,407,708 A | 4/1995 | Lovin et al. | |
| 5,510,066 A | 4/1996 | Fink et al. | |
| 5,562,951 A | 10/1996 | Karmen | |
| 6,596,224 B1 | 7/2003 | Sachs et al. | |
| 6,697,694 B2 * | 2/2004 | Mogensen | 700/119 |
| 2003/0043246 A1 | 3/2003 | Codos | |
| 2003/0076649 A1 | 4/2003 | Speakman | |

* cited by examiner

*Primary Examiner*—Fred J. Parker
(74) *Attorney, Agent, or Firm*—Sughrue Mion, PLLC

(57) ABSTRACT

The present invention provides a method of providing a surface layer or structure on a substrate. The method includes ink jet printing spaced first segments of the surface layer or structure material on the substrate and drying or curing the first segments. Additionally, the method includes ink jet printing further material segments in the gaps between the first segments and drying or curing the further segments. In the present invention, the material and/or curing and drying conditions are different in both steps of the method. The method also includes forming a surface layer or structure where segment material and/or curing and drying conditions are chosen so as to control mechanical properties of the surface layer.

21 Claims, 2 Drawing Sheets

Block | Infill | Block

PROVIDING A SURFACE LAYER OR STRUCTURE ON A SUBSTRATE

FIELD OF THE INVENTION

The invention relates to a method of providing a surface layer or structure on a substrate.

BRIEF DESCRIPTION OF PRIOR ART

A method of surface layer deposition which is becoming more common makes use of printing processes, particularly inkjet printing. Typically, the surface layer material is printed onto a substrate and then dried or cured.

These processes are used to fabricate a variety of devices including:
  rapid prototyping structures
  3-d structures for Braille & tactile graphics
  microfluidic structures, including medical bio-assay devices
  protective layers
  coatings on flexible substrates
  textile coatings.

U.S. Pat. No. 4,379,185 describes the use of rotary screen printing equipment to form decorative sheet material for example for use as floor coverings made up of laterally arranged regions of different colours.

WO-A-99/19074 describes apparatus for screen printing articles such as glassware in which different images are screen printed onto the glassware and then cured.

U.S. Pat. No. 5,407,708 describes a flexographic printing system for printing coatings on a substrate and curing those coatings. Again, this is for decorative purposes.

U.S. Pat. No. 5,562,951 relates to a method of decorating an article using a silk screen process.

All the techniques described in these prior art documents are concerned with decorative processes and are not relevant to processes of the type with which the invention is concerned and set out above.

Certain problems have arisen with these known techniques since it has been found that in some cases the drying or curing, typically UV curing, causes shrinkage of the deposited layer and this can induce stresses and strains into both the layer and the substrate leading to cracking and other problems.

SUMMARY OF THE INVENTION

In accordance with the present invention, a method of providing a surface layer or structure on a substrate comprises:

a) ink jet printing spaced first segments of the surface layer or structure material on the substrate and drying or curing the first segments; and a) ink jet printing further material segments in the gaps between the first segments and drying or curing the further segments, the material and/or curing and drying conditions being different to those in step (a), all the segments, after drying or curing, forming a surface layer or structure, wherein the segment material and/or curing and drying conditions are chosen so as to control the mechanical properties of the surface layer.

With this invention, instead of printing a complete surface layer in a single printing pass, we segment the layer in order to control local mechanical, and possibly also chemical, properties such as stress relief, toughness, flexibility and porosity.

Typically, a complete layer will be provided by carrying out each of steps a) and b) once but it would be possible to repeat step b) more than once so as gradually to fill up the gaps between the first segments.

The segmentation can be at various scales from individual inkjet drops (typically 40–50 micron diameter) up to one millimeter dimension or more.

The axis of segmentation may be varied dependent on geometry e.g. a substrate may be designed to flex or bend in a particular direction which can then be accounted for in the printed layer structure and segmentation.

A single surface layer will often be sufficient. However, in some cases, it may be desirable to provide thicker layers or a 3D structure and this can be most conveniently achieved by providing one or more further surface layers on top of the one surface layer by repeating steps a) and b) for each surface layer. In this case, it is particularly beneficial to provide that the arrangement of segments in each surface layer is different from the arrangement of segments in an immediately adjacent surface layer so as to minimise the vertical length of possible stress lines.

Typically, the segments will be arranged in a regular array although it is also possible to arrange them in an irregular array.

A particular advantage of providing the surface layer or structure in separate printing passes is that the curing or drying operation, (e.g. UV, IR intensity and/or dose) can be different for each pass. For example, different process and/or duration. In this way, different mechanical properties can be imparted to different segments within the same layer. Alternatively, or in addition, the material of the first segments may be different from the material of at least some of the further segments i.e. different materials (inks) are used in different printing passes. This enables particular property variations to be achieved. Examples of property variations between segments include:

The inclusion of a segment within a layer that would otherwise be brittle to act as a "crack stopping" region.

Where the printed layer forms an etchmask then materials of different physical and chemical resistance may be produced such that the layer breaks up into smaller pieces along segment boundaries when removed from the substrate. This may be achieved by:

Segments which have been exposed to a lower UV dosage within the layer that are more readily broken down during the removal. E.g. a UV cured acrylate based ink with varying degrees of exposure to LTV between segments.

Segments produced from materials with different resistance to removal chemistry. E.g. a UV cured acrylate ink with regions of a phase change ink interspersed.

Segments may be produced with different surface properties, roughness & surface energy, which can be used to control device performance. This may include variation of wetting characteristics within a micro-fluidic structure.

Segments may be produced with different surface morphology, for example matt & gloss areas within a layer of the same material in order to influence optical performance of those regions.

In some cases, the segments are built up in a series of print steps, the partial segments being optionally (partially) cured after each step. This enables thick segments to be formed.

The substrate may be rigid, flexible or sacrificial (removable after printing to leave free form structure). The invention is particularly advantageous with flexible substrates since it can be used to prevent bowing of the substrate due to induced stresses and to improve mechanical integrity of the deposited layer during any substrate distortion.

It will be appreciated that this invention has a number of advantages some of which have already been explained above. Further advantages include:

1) Enabling an ink to be used which has a shrinkage characteristic on drying, phase change or curing, which will naturally induce stress into the layer & substrate.

2) Enabling the use of a substrate & deposited layer having significantly different expansion characteristics (e.g. temperature coefficient)

3) The fabrication of 3-d structures where multiple prints or layers are required.

4) The use of the deposited layer as an etch mask in which removal of the layer or film after etching is improved; the layer break up into small pieces is assisted by the segment microstructure 5) The ability to produce an equivalent to a "fibre-reinforced" layer by the inclusion of highly cured & hardened lines within the deposited material matrix.

The particular advantages of using ink jet printing include:

The "digital" nature of an inkjet print makes it possible to change the pattern or size of segmentation very easily, even on a print by print basis. This allows different segment patterns for each material or layer of a built up structure with no set up time, (contrast with the need to generate multiple screens and then set up and align against the existing image).

Inkjet is therefore especially beneficial for rapid prototyping or any "fast turn" job.

Inkjet may be applied directly to 3D surfaces e.g. curved like a can, or mobile phone body. These non-flat surfaces may be particularly prone to the kinds of stresses induced on ink curing and hence this method is especially applicable.

BRIEF DESCRIPTION OF THE DRAWINGS

Some examples of methods according to the invention will now be described and contrasted with a known example with reference to the accompanying drawings, in which.

DETAILED DESCRIPTION OF THE EMBODIMENTS

Figure 1:
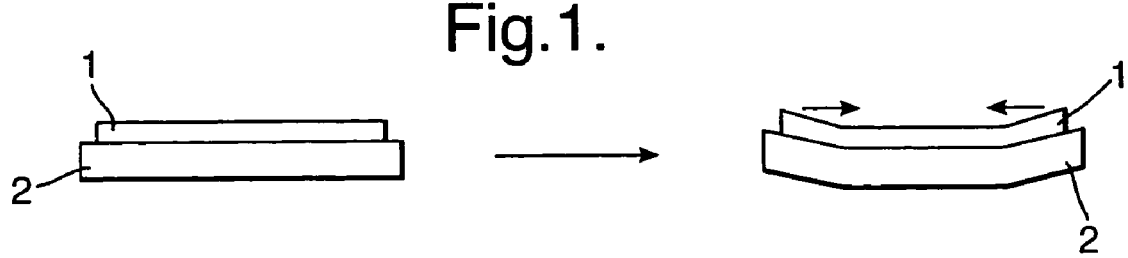
FIG. 1 illustrates schematically a known method.

FIG. 1 illustrates the problem which arises in a conventional process. In this process, a surface layer 1 is inkjet printed onto a substrate such as a mylar substrate 2. The surface layer 1 is then cured and this curing process introduces shrinkage of the deposited layer 1. This can induce stresses and strains into both that layer 1 and the substrate 2 which is clearly undesirable.

Figure 2:
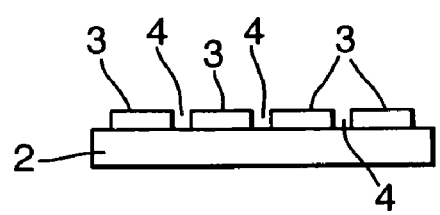
FIGS. 2 and 3 are schematic cross-sections through a substrate and superposed, deposited layer during different stages of an example of a method according to the invention.
Figure 3:
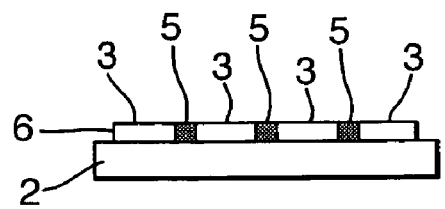

A first example of a method according to the invention is shown in FIGS. 2 and 3. As can be seen, in a first printing pass, a set of segments 3 are inkjet printed onto the substrate 2. They are then cured and because of their relatively small size, (typically individual ink drops) much smaller stresses will arise. The gaps 4 between the segments 3 are then filled with further segments 5 (FIG. 3) which are subsequently cured. The result is a continuous layer 6 in which the stress and strain problems of the prior art have been significantly reduced. In this example, a single second printing pass is carried out. In other examples the gaps 4 could be filled in more than one pass.

Figure 4:
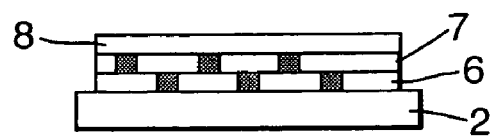
FIG. 4 is a view similar to FIG. 3 but of a second example.

Although in theory a single layer could be made of a variety of thicknesses, where particularly thick layers are required, then the process described with respect to FIGS. 2 and 3 can be repeated one or more times. FIG. 4 illustrates an example in which a second layer 7 has been laid down on the layer 6. As can be seen, the segments 5 in the layer 7 are offset from the segments 5 in the layer 6.

As explained above, the curing conditions used for the different segments 3,5 may be different and indeed different materials can be used as the inks which are printed.

In the FIG. 4 example, a further continuous layer 8 has then been printed onto the uppermost layer 7 in order to achieve a flat surface.

Figure 5:
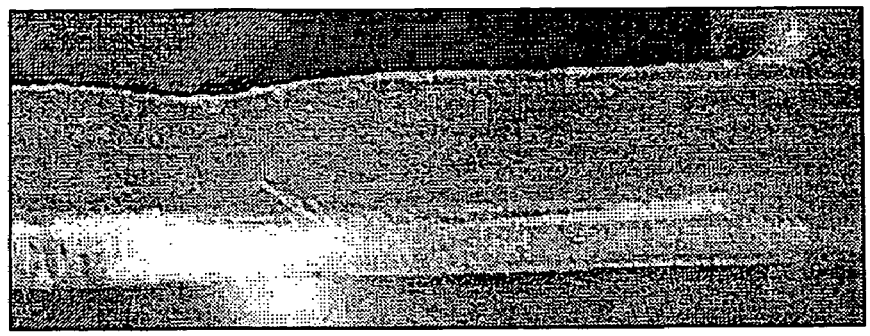
FIG. 5 is a photomicrograph through a part of an example of a layer which has been deposited using a known process.

FIG. 5 is photomicrograph illustrating an example of a surface layer built up using a known technique. In this case, a thick (~1 mm) layer of UV curable material was deposited onto a flexible mylar substrate, using a number of inkjet print passes. Continuous layers were printed & cured sequentially to build up the required thickness. The cross-section micrograph (FIG. 5) shows the fracture surface after deliberately bending the film in order to cause delamination from the surface. The region at the bottom of the layer can clearly be seen to exhibit brittle fracture across the entire film area at the substrate interface. There has been an abrupt & complete loss of adhesion.

In contrast, an alternative surface layer constructed using a method according to the invention will now be described with reference to FIGS. 6 to 8. In this case, the film thickness was built up using a modified image pattern. A square grid was overlaid onto the image in order to produce "blocks" 10 (Image 1, FIG. 6) in one print pass & infill 11 (FIG. 7) of the subsequent gaps in another. Multiple print passes of each image were used with lower curing levels (i.e. lower UV dose levels) for image 2 (FIG. 7) thereby creating a segment with a lower degree of cross-linking and hence enabling reduction of stress within the layer as well as a tougher overall structure. A final pass with a continuous layer (not shown) was printed as a final step in order to achieve a flat surface.

Figure 8:
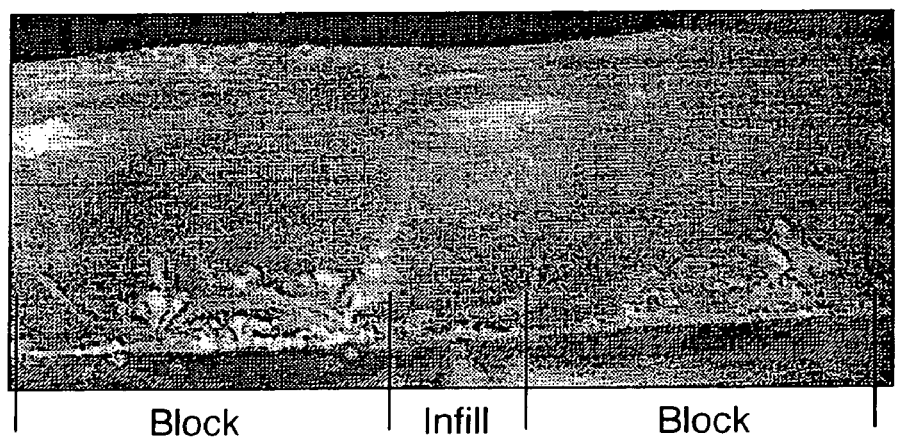
FIG. 8 is a photomicrograph showing part of a surface layer fabricated using the method of FIGS. 6 and 7.

The cross-section fracture surface micrograph of FIG. 8 shows brittle failure in the "blocks" however improved layer mechanical properties due to the influence of the tougher infill regions. On separation from the substrate, a grid of residual lines could be seen on the mylar corresponding to the infill image areas with improved adhesion.

Figure 6:
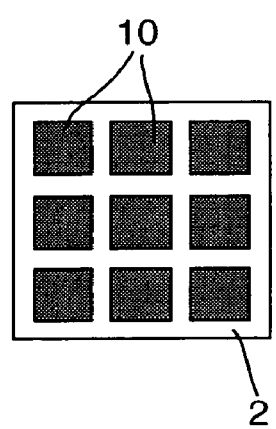
FIGS. 6 and 7 illustrate schematically the segment arrays of a fourth example.
Figure 7:
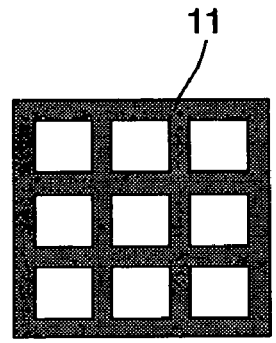

In more detail, the process used in connection with FIGS. 6 to 8 was carried out on a Jetmask DLP244 printing system, using Xaar XJ500 printheads and a Hg arc UV lamp with output power up to 160 W/cm. Print resolution was 720×720 dpi, with linear print speeds up to 11 inches per second.

The experimental conditions are give below:

Segment #1 areas comprised the "blocks" and were printed using a two stage process. A partial cure was carried out during printing at UV power levels of between 30 to 50% of the maximum. Once the image was completed, a final cure cycle was carried out by scanning the lamp once more over the image at full power. A number of layers were printed in order to build up the required thickness, where the conditions for each layer were controlled using combinations of partial and final cure cycles in order to achieve the required properties.

Segment #2 was then produced by printing the infill regions using very low (30%) cure. In some cases, there could be no partial cure at all (lamp shutter closed). A low final cure power (up to 50%) was also used. This allowed the material to flow and equilibrate between blocks. A number of layers were required to produce the same thickness as the segment #1 areas and the low power final cure was used on completion of each layer (in order to provide sufficient through cure) although this is optional.

A final layer, comprising a continuous whole area coverage, was used in order to produce a flat top surface and uniform layer thickness over all segments. This layer was partially cured at a low level (30 to 50%) in order to allow good ink coalescence during printing and hence a smooth surface. A final cure was then carried out at a maximum UV power to ensure a fully cured and tack free top surface was produced.

In all these examples, the substrate 2 may comprise any of the following:
  release films:—mylar, PTFE;
  flexible substrates:—PTFE, PET, polycarbonate, polyamide, textiles, paper, cardboard, copper laminates of flexible materials as used in e.g. PCB manufacture; and
  rigid substrates:—glass, FR4 copper laminate.

Examples of materials which could be printed onto the substrate 2 include:
  free radical, cationic, or hybrid UV curing inks;
  monomers such as:—acrylates or epoxides;
  oligomers such as:—acrylated urethanes, epoxies, polyesters or acrylics;
  phase change inks (hot melt wax);
  photoresists;
  soldermask materials;
  inorganic particles or nanoparticles such as:—metals, oxides (ITO, ATO); and
  phosphors.

We claim:

1. A method of providing a surface layer or structure on a substrate, the method comprising:
  a) ink jet printing spaced first segments of the surface layer or structure material on the substrate and drying or curing the first segments; and
  b) ink jet printing further material segments only in the gaps between the first segments and drying or curing the further segments, the material and/or curing and drying conditions being different to those in step (a), all the segments, after drying or curing, forming a surface layer or structure, wherein the segment material and/or curing and drying conditions are chosen so as to control mechanical property of the surface layer.

2. A method according to claim 1, wherein all the further segments are printed in a single printing pass.

3. A method according to claim 1, wherein all the first segments are printed in a single printing pass.

4. A method according to claim 1, wherein at least some of the first and further segments are provided in multiple print passes.

5. A method according to claim 1, further comprising, following formation of said surface layer, providing one or more further surface layers on top of the one surface layer by repeating steps a) and b) for each surface layer.

6. A method according to claim 5, wherein the arrangement of segments in each surface layer is different from the arrangement of segments in an immediately adjacent surface layer.

7. A method according to claim 1, wherein the segments are arranged in a regular array.

8. A method according to claim 1, wherein the substrate is flexible.

9. A method according to claim 1, wherein the curing processes carried out in steps a) and b) are different.

10. A method according to claim 1, wherein the material of the first segments is different from the material of at least some of the further segments.

11. A method according to claim 1, wherein the segment size is in the range from a single ink drop to a maximum lateral dimension of 1 millimeter.

12. A method according to claim 1, wherein after all segments have been printed, the method further comprises printing a further, continuous finishing layer over the surface layer(s).

13. A method according claim 1, wherein the mechanical properties of the first and further segments differ from one another.

14. A method according to claim 1, wherein the mechanical properties include one or more of stress, toughness, brittleness and adhesion.

15. A method according to claim 1, wherein the substrate is planar.

16. A method according to claim 1, wherein the substrate is curved.

17. A method according to claim 1, wherein the drying or curing steps are carried out using one of UV and IR curing.

18. A method according to claim 1, wherein the drying or curing steps are carried out for different durations in steps (a) and (b) respectively.

19. A method according to claim 1, wherein different curing or drying processes are carried out in steps (a) and (b) respectively.

20. A method according to claim 1, wherein the first and/or further segments are found by printing a series of partial segments on top of one another.

21. A method according to claim 20, wherein the partial segments are at least partially cured after being printed and prior to printing the next partial segment thereon.

* * * * *